Dec. 10, 1968  D. C. OAS  3,414,982
FOOD DEHYDRATOR
Filed May 2, 1966
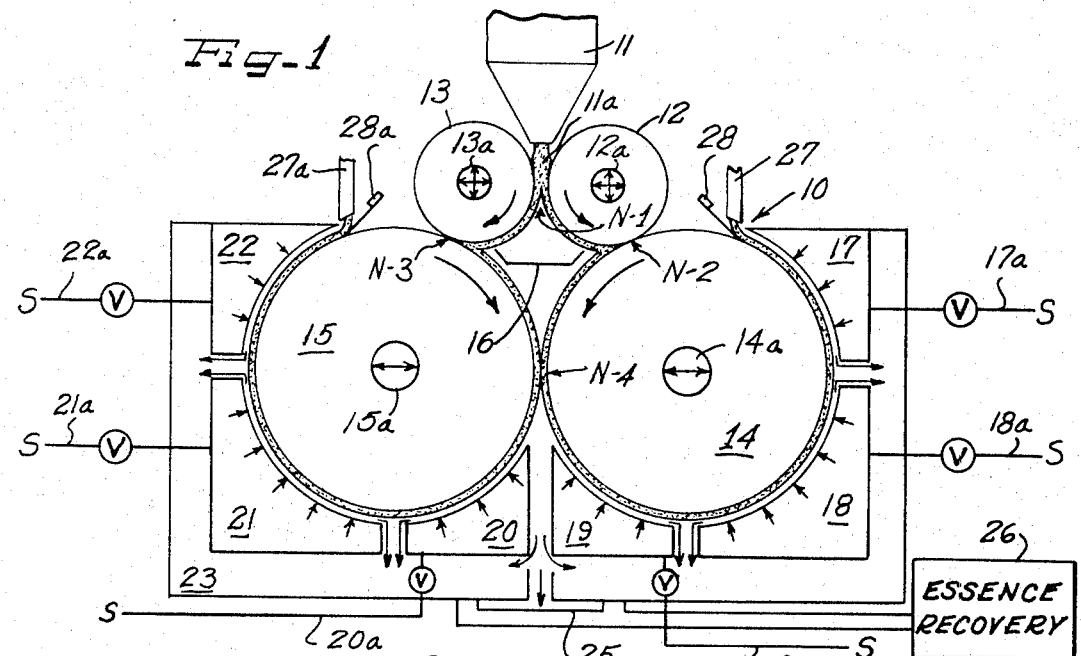
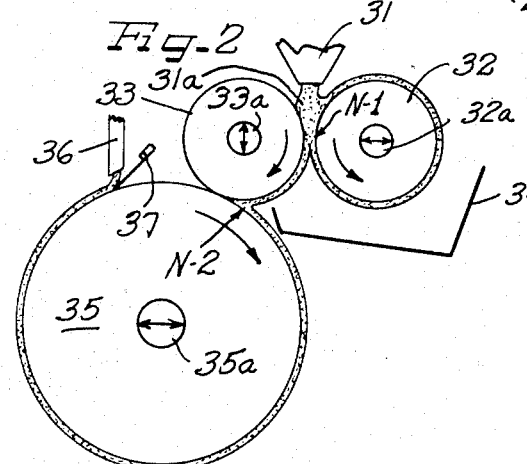
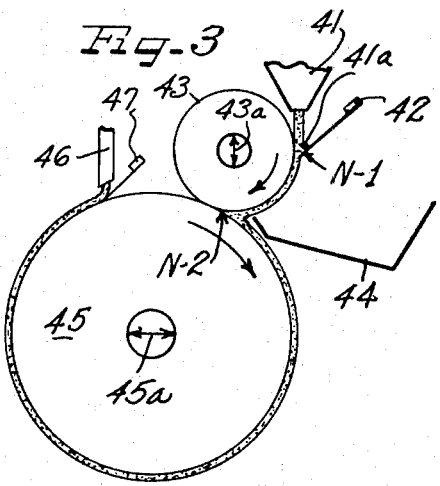
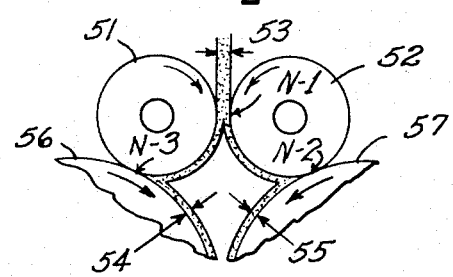
INVENTOR
David C. Oas
BY *Hill, Sherman, Meroni, Gross & Simpson* ATTORNEYS United States Patent Office 3,414,982
Patented Dec. 10, 1968

3,414,982
FOOD DEHYDRATOR
David C. Oas, Pittsfield, Mass., assignor to Beloit Corporation, Beloit, Wis., a corporation of Wisconsin
Filed May 2, 1966, Ser. No. 546,936
10 Claims. (Cl. 34—31)

ABSTRACT OF THE DISCLOSURE

A method and apparatus for dehydrating food products utilizing single or double drying drums with metering means to precisely control the thickness of the food product applied to the surface of the drying drums. A plurality of air-type dryers having independently controlled heating zones cooperating with the drying drums for more efficient removal of moisture.

---

The present invention relates generally to improvements in food dehydrating assemblies and methods wherein a slurry of a food product is applied to a moving drying surface, and more particularly, to the provision of an apparatus and method of uniformly applying food products in precisely controllable layers to a rotating dryer drum, achieving a moisture uniform product.

In certain conventional installations for dehydrating a food product, a double dryer type assembly maintains a puddle of food slurry immediately ahead of a narrow spacing or nip between the dryer drums. The dryer drums are continuously rotated toward each other to form a product layer on each of the drum surfaces, and the layer is dried by heat transfer from the dryer drums, which may be heated internally with steam. Control is difficult to obtain in these devices and attempts are made by controlling the rotational speed of the drums, the heat of the steam within the drums, the spacing between the dryer drums, etc. These factors are attuned so that the food product reaches a desired final moisture content at an angular distance of about 225° from the nip at which point the food product is removed, as by scraping with an appropriate doctor blade, to fall onto conventional transportation means.

Great difficulty is experienced in this type of structure in attempting to uniformly control the amount of food slurry that adheres to the dryer drum surfaces. Uneven distribution of the food slurry on the drying drum surfaces causes irregular drying with non-uniform moisture content in the final product. The variable spacing at the nip of the conventional dryer drum is not a sufficient control to insure uniform film thickness of the food product as the physical characteristics of the food product do not generally leand themselves to uniform manipulation by mere application of pressure. The internal heating means, usually steam, necessarily maintains the drum surfaces at a uniformly high temperature along the full outer periphery of the dryer drums. The food product contacts the heated drum surfaces prior to the actual nip and the heat tends to cause a change of viscosity in the food product as well as causing initial dehydration to begin. The change of viscosity in the food product allows the food product to run by the nip rather than being maintained in a puddle above it. The initiation of dehydration reaction immediately prior to the nip causes the layer of food product immediately adjacent the outer periphery of the drum to adhere or agglomerate thereon and pass through the nip unevenly. These and various other complex factors tend to make conventional food dehydration assemblies difficult to operate and fail to provide a uniform end product.

The present invention provides, among other things, an improved food dehydrator and method of dehydrating food which significantly enhances the uniformity of the end product and allows a greater control of the dehydration reaction. Novel metering means are provided for distributing the food product over the dryer drum in a film of uniform thickness, producing a uniformly dehydrated end product. Substantial drying capacity is provided in the structure of the present invention by the inclusion of an improved air-type dryer which cooperates with the drum to remove sufficient moisture from the food product on the dryer drum so that a doctor blade acting against the surface of the drum removes the dehydrated food product.

More specifically, the present invention involves a dryer assembly including at least one rotating imperforated drum together with an applicator roll rotatably in contact with the drum allowing its peripheral surface to form a wiping nip. A feed means is stationed in working relationship with the applicator roll to supply a slurry of food product, in various adjustable consistencies, to the applicator roll which in turn, in conjunction with a metering means, applies a predetermined amount of food slurry in the form of a thin uniform film to the surface of the dryer drum. The thus formed uniform thin layer of food product on the periphery of the drum is exposed to a heating means, which may involve a series of heating zones wherein heated air is applied to the film during its travel through the various zones, resulting in the removal of an optimum amount of moisture from the food product without exceeding a predetermined temperature limit for the food product being processed. A suitable doctor blade or the like is employed thereafter to scrape the now dried food product off the periphery of the dryer drum and the dehydrated food product is delivered to suitable conveyor means for packaging stations or the like.

The present invention also includes a process of dehydrating food products that includes converting the food product into an aqueous slurry having a consistency in the range of 0.1% to 50% and continuously supplying the slurry to a metering and applying means; thereafter applying the metered slurry continuously to a heated moving drying surface, which may have a series of distinct drying zones presentnig differentiated temperatures to the slurry of food product to insure maximum moisture removal without detrimental break-down of the fod product being processed. Thereafter continuously removing the dried food product from the periphery of the drying surface by appropriate removal means.

Accordingly, an object of the present invention is to provide an improved dryer assembly and method of dehydration particularly applicable to dehydration of food products.

Another object of the present invention is to provide a dryer assembly wherein controllable uniform layers of food product are applied to a dryer drum to insure uniform moisture removal.

A further object of the present invention is to provide a dryer assembly which produces a more uniform product of higher quality with an economical advantage over the apparatus previously employed for this purpose.

A still further object of the present invention is to provide a dryer assembly which maintains a puddle of food product away from the dryer drum allowing greater control of the film uniformity and thickness that is applied to the dryer drum.

Other objects, advantages and features of the present invention will become more apparent to those skilled in the art from the following teachings of the principles of the invention in connection with the disclosure of the preferred embodiments thereof in the specification, claims and drawings, in which:

In the drawings:

FIGURE 1 is a diagrammatic elevational view showing one embodiment of the dryer assembly constructed and operating in accordance with the principles of the present invention;

FIGURE 2 is an essentially diagrammatic elevational view showing another embodiment of the invention;

FIGURE 3 is a diagrammatic elevational view showing a further embodiment of the invention; and FIGURE 4 is a fragmentary sectional detailed elevational view taken of the top portion of FIGURE 1 showing the relative thickness of the film product along the various points shown.

As shown on the drawings:

In FIGURE 1, reference numeral 10 indicates generally the overall dryer assembly and includes a suitable frame support (not shown) for the elements of the apparatus. Mounted above the dryer assembly 10 is a suitable feed means 11 continuously supplying a slurry of food product 11a to the dryer assembly 10. Rotatably mounted on suitable supports (not shown) are a pair of relatively small diameter rolls 12 and 13. Rolls 12 and 13 are mounted in generally parallel relationship to define a nip N-1. In the embodiment here shown, rolls 12 and 13 are counter-rotatable, as indicated diagrammatically by the curved arrows, and act simultaneously as metering and applying means. The rolls 12 and 13 are provided with conventional vertical and horizontal adjustment means, 12a and 13a, indicated diagrammatically as four-directional arrows, and are also connected to suitable independent driving means (not shown). The nip N-1 may thus be adjusted in either direction as the operating conditions dictate. Generally, the rolls 12 and 13 are spaced apart a distance to allow a certain amount of food slurry to pass therebetween while at the same time maintaining a puddle of food slurry immediately ahead of the nip N-1. The horizontal spacing may be varied generally in the range of 0.001 inch to 0.025 inch, depending primarily on the consistency of the food product being processed. The vertical spacing may be varied generally in the range of 0.0001 to 0.001 inch. In certain instances where a food product having a low viscosity or lack of solid matter is being processed, it may be desirable to use a conventional save-all device 16 immediately below the nip N-1 to catch any matter tending to bypass the nip to prevent it from agglomerating on the dryer drums below.

Food products, such as tomatoes, lemons, milk, etc., are converted into suitable slurries by various types of processing machines which may, if desired, intermix water, ethanol alcohol or some other such palatable volatile liquid vehicle to adjust the consistency of the slurry to a desirable solid content and aid in dissolving certain constituents of the food product. It is generally desirable that the mass of food product to be dehydrated contain approximately 0.1% to 25% solids and that the mass retains enough undissolved pulp, fibers or other like solids which impart coherence to the mass resisting any tendency to shear films from the mass of food product. In other words, the food product should be rendered to a slurry which contains enough solids, generally around 50%, to resist tendencies to readily shear films or layers therefrom.

The rolls 12 and 13 simultaneously act as metering means for each other, i.e., roll 12 meters or controls the amount of food product adhering to roll 13 and vice versa. The applicator-metering rolls are generally not heated in order to maintain a consistent viscosity of food slurry ahead of the nip N-1. In the course of counter-rotating, the rolls 12 and 13 shear a relatively thick layer of food product from the puddle of food product retained immediately ahead of the nip N-1 and this relatively thick layer passes through the nip N-1. Immediately on the off-running side of the nip N-1 the thick layer is slit into two substantially equal relatively thin layers, each adhering to the respective peripheral surfaces of the rolls 12 and 13.

A theory by way of explanation for this phenomenon may be that generally, moisture laden materials tend to behave as fluids in respect to a solid surface. A property of fluids is that when they are immediately adjacent to a solid surface they cannot slip relative to the surface, that is, they must move at the same speed as the surface and tend to shear from the remaining fluid mass. In applying this general statement to the observed phenomenon it will be noticed that the fluid mass, the puddle of food product immediately ahead of the nip contacts the solid surfaces of the rolls 12 and 13 and the rolls 12 and 13 move relative to the puddle and thereby tend to carry with them the layer of food product immediately adjacent their surfaces as no slippage can occur between the solid roll surfaces and the fluid food particles. The splitting of the relatively thick film into two substantially equal thin films may be explained under similar theories in that the cohesive forces holding the food product molecules together are not as great as the forces holding the food product molecules immediately adjacent the roll surfaces to the roll surfaces and that, therefore, a pressure gradient is created wherein the molecular food product immediately adjacent one of the rolls experiences the greatest tendency to adhere to the roll surface while the molecule immediately adjacent the first molecule experiences slightly less force and so forth, so that in the center of the mass between the two solid surfaces, there is in effect a zero force drawing the molecules toward either of the surfaces, thus allowing a substantially equal split between the molecules. This type of theory would appear to be consistent with fluid dynamic theories, but the theory is offered only by way of explanation and not by way of limitation as it is recognized that other theories may be advanced to explain the phenomenon observed.

It will be observed that rolls 12 and 13 effectively allow careful control of the film thickness of the food product adhering to their respective peripheral surfaces by the adjustment of the spacing therebetween, the maintenance of a constant viscosity of the food product at the point of contact to the rolls, by the rotational speed of the rolls and by the relative sharp or narrow nip formed between the rolls. As was earlier pointed out, the rolls 12 and 13 have a relatively small outer diameter, which coupled with the adjustment means 12a and 13a allow for a precisely controllable spacing at the nip N-1. The small outer diameter of the rolls 12 and 13 limit the area of peripheral contact between the rolls. This limited area of contact, or narrow nip, directs not only that a small puddle of food product be formed ahead of the nips, but additionally limits the surface contact between the solid rolls and the fluid food product. A small puddle tends to restrict the amount of food product adhering to the applicator-metering rolls and also restricts the amount of food slurry tending to bypass or run by the nip N-1 to agglomerate further in the dryer surface. The rolls 12 and 13 are thus effective controls limiting the thickness and amount of food product adhering to their respective peripheral surfaces. Rolls 12 and 13 are generally provided with a cover of stainless steel or aluminum (or some other such non-toxic surface) and have an outer diameter in the approximate range of 1 inch to 12 inches. It will be understood, of course, that other materials and diameters can be used and that such are within the scope and teachings of this invention.

Dryer drums 14 and 15 are rotatably mounted on suitable parallel axes to define a close running nip relationship N–4. The dryer drums are preferably counter-rotatable, as shown by the curved arrows, and are driven by independent drive means (not shown). The dryer drum 14 is in peripheral rotary contact with the applicator roll 12 at the nip N–2 and the dryer drum 15 is in similar contact with the applicator roll 13 at the nip N–3. The nips N–2 and N–3 are hereinafter referred to as wiping nips to more adequately characterize their function. The dryer drums 14 and 15 are provided with appropriate adjustment means (preferably in a horizontal direction) 14a and 15a, respectively, and are indicated diagrammatically by the double headed arrows. These adjustment means allow precise determination of the close running nip defining relationship N–4. This spacing is approximately in the range of 0.0025 to 0.10 inch. It is to be noted that there is no need for the peripheral surfaces of the dryer drums, even when coated with the food product, to actually contact one another.

Dryer drums 14 and 15 are imperforate and may be heated internally by appropriate means (not shown), as for example, steam, to any desired temperature but preferably below the detrimental temperature of the food product being processed. It is understood, of course, that each food product has an individual heat tolerance so that any general statements concerning numerical heat limits are of no great aid in determining a particular food product's heat tolerance. Also, it is well known that food products are made up of complex chemical molecules which tend to react at certain heat levels, as by splitting into less complex molecules or in certain instances, combining with other chemical complexes present to form additional complexes, however, all of which reactions are generally detrimental in respect to the food value or flavor. It is, therefore, advisable not to exceed the particular food product's heat tolerance. In respect to general heat tolerance, it has been observed that generally, in the embodiment illustrated in FIGURE 1, it is desirable to internally heat the dryer drum to approximately 220° F.

As was previously discussed, applicator rolls 12 and 13, respectively, contact dryer drums 14 and 15 to form wiping nips N–2 and N–3. Each applicator roll is rotating in an opposite direction in respect to the dryer drum it contacts, thus, roll 12 is rotating counter to dryer drum 14 and roll 13 is rotating counter to dryer drum 15. There is a minimum amount of clearance between the applicator rolls and the dryer drums, at their respective nips N–2 and N–3. Preferably there is no clearance at the point of contact so that none of the food product adhering to the applicator roll periphery passes beyond this point of contact. In other words, the dryer drum 15 wipes the food slurry off applicator roll 13 and the dryer drum 14 wipes the food slurry off applicator roll 12. The counter-rotation of applicator rolls to the dryer drums produces the desired wiping action, removing the slurry from the surfaces of the applicator rolls to the surfaces of the dryer drums. The fact that the dryer drums are pre-heated prior to being contacted by the food slurry tends to aid in transferring the food slurry from the surface of the applicator rolls to the surface of the dryer drums. The dryer drums 14 and 15 are generally rotated at a faster peripheral speed than the applicator rolls, the ratio being generally in the range from 1:2 to 1:20 and preferably about 1:10. In other words, it is preferable to have the dryer drum peripheral speed moving about 2 to 20 times faster than the peripheral speed of the suface of the applicator rolls. This difference in speed of rotation of the applicator rolls and dryer drums prevents any puddles from forming at the wiping nips N–2 and N–3. Because no puddles form on or are in contact with the dryer drums, uniform heating and dehydration of the food product takes place.

As the thin film of food product moves beyond the close running nip defining relationship N–4, it encounters a series of air chambers or hoods which direct a flow of high velocity hot air from orifices onto the product layer. The hot air hoods are arranged in sections to control the air temperature over successive segments of the circumference of the dryer drums and as the heat tolerance of the product decreases, the temperature of the air discharged against the outer surfaces also decreases. The layer or film of food product on the drum 14 successively passes air hoods 19, 18 and 17. The layer of food product on the drum 15 successively passes air hoods 20, 21 and 22. As the dried food product is carried upwardly beyond the air hoods, it is doctored from the surfaces of the drum by suitable doctor blades 28 and 28a and picked up by suction nozzles 27 and 27a to be conveyed to a packaging station or the like. It is understood of course, that other appropriate conveying and removal means may be employed if desired.

Heated air flow to the individual hoods is obtained from a suitable supply source indicated at S. Each hood is connected through appropriate individual pipes 17a, 18a, 19a, 20a, 21a and 22a, or the like, to the heated air or steam supply S and controlled by a suitable valve V. This type of air hood system is more fully described in co-pending application of R. A. Daane, U.S. Ser. No. 413,263, filed Nov. 23, 1964, which is incorporated herein by reference. The air hoods are enclosed by exhaust chambers 24 and 23 to prevent the vapor from escaping into the work area surrounding the dry assembly. A special take-off line 25 may be used for the recovery of flavor constituents of the food product as shown by the box labeled Essence Recovery. Each air hood 17, 18, 19, 20, 21 and 22 is independently temperature controllable to insure maximum dehydration of the food product without any detrimental effects thereon. The air hoods are provided with orifices uniformly distributed over the area of each hood surface facing the dryer drum to allow heated air to escape as indicated by the arrows.

In the arrangement shown in FIGURE 2, the food product is supplied to the rolls 33 and 32 by means of the feed nozzle 31. Rolls 32 and 33 have parallel close running peripheral surface portions defining a nip at N–1. The food slurry forms a small puddle 31a immediately ahead of the nip N–1 which is confined by conventional end closing means (not shown) and the peripheral surfaces of the rolls 32 and 33 which are immediately ahead of the nip N–1. Roll 33, which functions as the applicator roll and is provided with a vertical adjustment means 33a, shown as a double headed arrow, allowing the roll 33 to be moved in the vertical direction. Roll 32, which functions as the metering roll, is provided with a horizontal adjustment means 32a, allowing adjustment of the spacing at the nip N–1. Rolls 32 and 33 are counter-rotatable as indicated by the curved arrows and shear off a relatively thick film of food slurry from the puddle ahead of the nip N–1 and, as rolls 32 and 33 rotate away from one another, a thin film adheres to the surface of each of the rolls. Roll 32 recirculates the film back to the puddle, and excess or overly dilute (as lacking sufficient solid content) food slurry being entrapped by conventional save-all device 34. Conventional means (not shown) are provided to recirculate the entrapped food slurry from the save-all device 34 to the feed nozzle 31.

Dryer drum 35 is mounted for rotation in a direction opposed to the rotation of the applicator roll 33 and a conventional horizontal adjustment means 35a, shown as a double headed arrow, allows limited horizontal movement of the axis of rotation of the dryer drum. The dryer drum 35 has a point of contact with the applicator roll 33 at nip N–2. This point of contact is more properly termed a wiping nip, as the thin film of food slurry adhering to the peripheral surface of the applicator roll is wiped off of and onto the dryer drum at this pressure point. The peripheral surface of the applicator roll 33 and the dryer drum 35 come into very close proximity, and may come into actual contact so that generally, very little, if any, food slurry passes beyond the nip N–2. Somewhat similar type applicator rolls are shown by H. F. Budzien in co-pending patent application Ser. No. 302,631, filed Aug. 16, 1963, and now Patent No. 3,264,-753, which is incorporated herein by reference. However, Budzien does not employ the wiping nip of the present invention. The dryer drum 35 may be heated internally by suitable means (not shown) to raise its peripheral surface temperature sufficiently to dehydrate the food product being processed, without causing detrimental breakdown. If desired, air hoods, such as shown in FIGURE 1, may be placed around the periphery of the dryer drum 35 to insure maximum temperature control, however, in certain dehydration processes, satisfactory results have been obtained without the use of such air hoods.

A number of factors combine to prevent the food slurry from going beyond nip N–2 without being transferred to the dryer drum surface. First, the close running relationship between the moving surfaces tend to prevent any film from passing the point of contact. Second, the relatively faster rotational speed of the dryer drum 35 tends to create a suction-like effect promoting a transfer of the food slurry to the surface of the dryer drum. Third, the temperature difference between the dryer drum and the applicator roll tends to change the adhesive and viscosity forces holding the food slurry to the surface of the applicator roll, thereby allowing increased transfer of the food slurry to the dryer drum. Fourth, the actual consistency of the food slurry tends to resist compression at the nip N–2 and is forced to transfer to the surface of the dryer drum by taking the path of least resistance. Of course, it will be understood, that only some of the more important factors are mentioned and that there are other factors influencing the transfer of food slurry from the applicator roll to the dryer drum.

As the food slurry is applied to the peripheral surface of the dryer drum 35, it is carried by that surface for approximately 225° whereat a suitable doctor blade 37 scrapes or otherwise cleans the now dehydrated food product off the surface of the dryer drum. Positioned in working relationship with the doctor means 37 is a vacuum take-off 36 tending to suck the dried food product up and away from the dryer assembly. Vacuum take-off 36 is connected to a suitable conveyance means (not shown) transporting the dried food product to further processing stations, as for example, a packaging station. It will be understood, of course, that other suitable product removal means may be employed in place of the vacuum take-off 36 or the doctor blade 37, and that such are within the scope of the invention.

FIGURE 3 illustrates a modified embodiment of the structure discussed in FIGURE 2, and the reference numerals indicate like parts except that they are raised by a factor of 10. A feed means 41 provides a continuous supply of food slurry 41a to the nip N–1. The nip N–1 is defined by an applicator roll 43 and a metering means 42. Applicator roll 43 is driven in a counter-clockwise direction, i.e., in a direction of flow of the food slurry from the feed nozzle, to enable it to shear off a thin film of food product from the puddle thereof formed immediately ahead of the nip N–1. The applicaor roll 43 is also provided with vertical adjustment means 43a, as idicated by the double headed arrow, to allow vertical displacement of the applicator roll, which when such is needed or desired.

Metering means 42 is provided with suitable adjustment means (not shown) permitting variations in the spacing at the nip N–1 between the applicator roll 43 and the metering means 42, which may be, as for example, a thin metal plate extending the length of the applicator roll mounted on a suitable support to form an angle with the surface of the applicator roll. A small puddle of food slurry is formed and maintained immediately ahead of the point of closest proximity, N–1, between the rolls 43 and the metering means 42. The rotational force of the applicator roll 43 tends to shear a thin uniform film of food slurry from this puddle and carries it downward to a point N–2 which lies in a plane tangent to the surfaces of the applicator roll 43 and the dryer drum 45. Mounted in close working relationship to the applicator roll 43 below the nip N–1 and closely adjacent to the nip N–2 is a conventional save-all device 44 to catch any food slurry tending to escape from the nip N–1 or from the surface of the applicator roll. The save-all device 44 is provided with conventional means (not shown) for returning the food slurry entrapped therein to the feed means 41.

Positioned immediately below and somewhat offset to one side of the applicator roll 43 is the dryer drum 45. Dryer drum 45 is mounted for rotation in an opposing direction to the rotation of applicator roll 43. Horizontal adjustment means 45a are provided on the center axis of the dryer drum to allow limited horizontal movement of the dryer drum. Applicator roll 43 and dryer drum 45 form a wiping nip N–2 by having at least a point of their peripheral surfaces touch a common tangential plane, i.e., as by actual touching of the peripheral surfaces at the nip N–2. The food slurry is transferred from the surface of the applicator roll 43 to the surface of the dryer drum 45 by a wiping action. The rotational speed of the dryer drum 45 tends to prevent a puddle or agglomeration from forming at the wiping nip N–2. Thus, a thin uniform film is applied to the dryer drum surface allowing uniform dehydration of the food product. The dryer drum 45 may be internally heated as by steam, or air hoods, similarly to those discussed and shown at FIGURE 1. The food slurry continuously dehydrates as the dryer drum revolves and generally reaches a desired moisture content about 225° away from the point of application N–2. The dried food product is removed from the surface of the dryer drum 45 by a suitable doctor blade 47 or some other similar device. The dried flaky food product is conveyed away from the dryer assembly by a suction take-off means 46. Generally, the dried food product is conveyed to a packaging station, but may additionally be taken to other stations for further processing.

FIGURE 4 shows a portion of the assembly shown at FIGURE 1 to better illustrate the relative thickness of the food slurry at the various positions as it is transferred from the feed supply to the drying surface. The food product is rendered into a slurry by intermixing with an aqueous solvent, either pure water, ethanol, a mixture thereof, or some other relatively palatable, volatile liquid vehicle, to a solid content in the range of 0.1% to 25% and passed on to the feed means. The feed means, (not shown) has a nozzle allowing the feed slurry to be fed at a predetermined thickness 53 to a nip N–1 defined between the rolls 51 and 52. While the nozzle orifice may be controlled within any desired practical limits, it has generally been found desirable that the nozzle be adjusted so as to feed a film thickness in the range of 0.001 to 0.025 inch. This relatively thick film is fed to the rolls 51 and 52 at a point N–1 where their respective peripheral surfaces approach one another. As was previously explained in connection with FIGURE 1, these applicator-metering rolls are provided with adjustment means (not shown in FIGURE 4 for clarity) to allow control of the thickness of food slurry passing between the roller surfaces. A small excess of food slurry in the form of a puddle, is usually maintained ahead of the nip N–1 to insure a continuously uniform film of the food slurry. Any irregularities, lumps, globs or the like, in the food slurry is either rendered smooth by the rotational mixing action of the rolls or is squeezed by the nip N–1 into a film or falls onto a save-all device that may be positioned immediately below the nip, as shown in FIGURE 1.

As the food slurry passes the nip N–1 it splits into two substantially equal films 54 and 55 and adheres to the downwardly sloping surfaces of the rolls 51 and 52. This relatively thin film of food slurry, which is substantially free of any irregularities or agglomerations, is then wiped onto the respective dryer drums 56 and 57. The rolls 51 and 52 barely clear the surface of the dryer drums 56 and 57 so that a wiping action takes place. Generally, the dryer drums are rotating at a peripheral speed of 2 to 20 times faster than the applicator-metering rolls 51 and 52. This difference in speed prevents any puddle of food slurry from forming at the wiping nips N–2 and N–3. Further, this difference in speed causes a stretching type force to expand the layer of food slurry into still thinner films. The thin layers 54 and 55 of the food slurry, are uniformly dehydrated as the heat transferred throughout the layers is at at constant and uniform rate, allowing all particles in the layer to be heated at the same temperature. When all the molecules in a given area are at a relatively equal heat level, sufficient to cause evaporation, the heat is then used to convert the liquid constituents into vapor and dehydration takes place. If a non-uniform film is subjected to such heat, obviously, it will have areas of evaporation while other thicker areas will still be undergoing temperature rises. Thus, by providing a uniformly thin film, not only a greater rate of evaporation takes place as in a given area there are relatively less molecules to heat, but also a more moisture-uniform product is obtained.

Thus, it will be seen that I have provided an improved food drying method and structure which meets with the objectives and advantages set forth. The mechanism provides an improved dehydration assembly avoiding disadvantages heretofore available and provides improved features of construction and operability.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A process for drying food product comprising, converting food product into an aqueous slurry having a consistency in the range of 0.1% to 50%, continuously supplying said slurry to a conveying metering applicator means, continuously applying the metered slurry to a heated moving drying surface having a series of distinct drying zones presenting differentiated temperatures to the slurry to ensure maximum moisture removal without causing a detrimental breakdown of the food product, and continuously removing the dried food product from the periphery of the drying surface.

2. A machine for drying food product comprising at least one rotating imperforate heated drum, an applicator roll rotatably contacting said drum along its peripheral surface, to form a wiping nip, said drum and applicator roll having peripheral surfaces moving in opposite directions, feed means for supplying a slurry of food product to the periphery of said applicator roll prior to said roll contacting said drum, rotary metering means in spaced relationship to said periphery of the applicator roll adjacent said feed means controlling the thickness of food product adhering to the applicator roll so that precisely controllable uniform quantities of food product are continuously applied onto the rotating drum by said applicator roll at the wiping nip, and a removal means positioned beyond said nip removing the dried product from the peripheral drum surface.

3. A machine for drying food products comprising at least one heated rotatable drying drum, at least one applicator roll rotatably contacting the drying drum at a point on its peripheral surface to form a wiping nip, a first means driving the applicator roll in a first direction, a second means driving the drying drum in a second direction, means for supplying a slurry of food product to the applicator roll, rotary metering means in close running relationship with the applicator roll away from the drying drum controlling the thickness of food product adhering to the applicator roll, heating means for drying the food product, and means for removing the dried food product from the peripheral surface of the drying drum positioned beyond said wiping nip, whereby a precisely controllable uniform layer of food product is continuously applied onto the rotating drying drum by the applicator roll allowing the food product to be uniformly dried without exceeding predetermined temperatures for the food product.

4. A machine for drying food products according to claim 3 which includes a pair of cylindrical counter-rotatable heated dryer drums in close running nip-defining a pair of applicator rolls in working relationship with said drums, means defining a plurality of separate distinct heated drying zones along the periphery of said drums following said nip relationship, means for heating each of said zones to a predetermined drying temperature applying heat to the outer exposed surface of the food product on the drums so that maximum moisture removal is accomplished without exceeding a predetermined permissible temperature for the food product at the moisture content of the product in the location of said zones.

5. A machine for drying food product according to claim 4 which includes adjustment means for varying the close running nip-defining relationship between the counter-rotatable heated drying drums.

6. A machine for drying food product according to claim 4 including a pair of counter-rotatable applicator rolls in close running nip-defining relationship with each other and simultaneously each applicator roll defining a wiping nip relationship with each of the drying drums respectively.

7. A machine for drying food product according to claim 6 wherein each applicator roll is the metering means for the other applicator roll.

8. A machine for drying food product according to claim 3 wherein the rotating imperforate heated drum has a relatively faster peripheral speed at the wiping nip than the peripheral speed of the applicator roll, thereby wiping the food product off the peripheral surface of the applicator roll onto the peripheral drum surface and removing the food product from said wiping nip without forming a puddle of food product thereat.

9. A machine for drying food product according to claim 3 wherein the metering means is a roll counter-rotatable to the applicator roll and forms a close running nip-defining relationship with the applicator roll so that the slurry of food product supplied to the aplicator roll passes through said close running nip-defining relationship shearing the food product into two substantially equal portions, one portion of food product adhering to the peripheral surface of the applicator roll and the other portions to the metering roll, whereby a controllable thin uniform layer of food product is applied to the periphery of the drying drum.

10. A machine for drying food product according to claim 3 wherein the metering means is a roll mounted in a generally parallel nip-defining relationship with the applicator roll and spaced apart a predetermined distance to shear the slurry of food product supplied to said nip between the peripheral surfaces of the metering roll and the applicator roll whereby a controllable thin uniform layer of food product is applied to the periphery of the drying drum.

References Cited

UNITED STATES PATENTS

| | | | |
|---|---|---|---|
| 3,363,665 | 1/1968 | Daane et al. | 34—112 XR |
| 2,259,606 | 10/1941 | Beardslee et al. | 34—112 X |
| 2,414,580 | 1/1947 | Birdseye | 34—112 X |
| 2,812,591 | 11/1957 | Kling | 34—112 X |
| 3,068,585 | 12/1962 | Overton | 34—114 X |
| 3,078,592 | 2/1963 | Coar | 34—122 |
| 3,213,858 | 10/1965 | Merritt et al. | 34—122 X |
| 3,264,753 | 8/1966 | Budzien | 34—112 |
| 3,294,554 | 12/1966 | Osborne et al. | 34—120 X |

CHARLES J. MYHRE, *Primary Examiner.*

A. D. HERRMANN, *Assistant Examiner.*

U.S. Cl. X.R.

99—199; 159—010, 049; 34—112, 114; 222—281